Nov. 12, 1963       J. H. KOENIG ETAL         3,110,619
            INSULATED ELECTRICAL CONDUCTOR
                Filed May 15, 1961
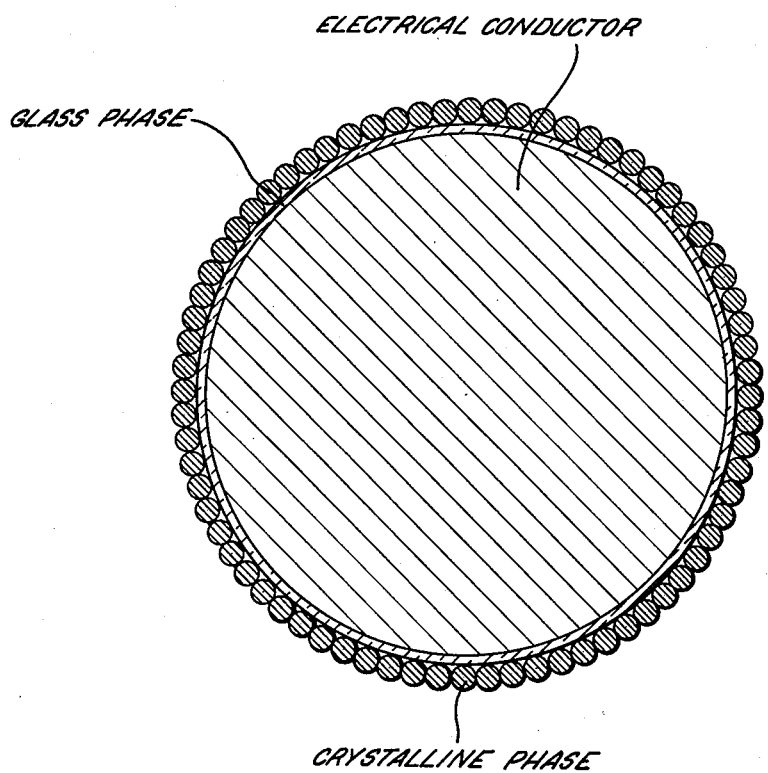
INVENTORS.
JOHN H. KOENIG
ERNEST L. KASTENBEIN
BY
ATTORNEYS.

United States Patent Office 3,110,619
Patented Nov. 12, 1963

3,110,619
INSULATED ELECTRICAL CONDUCTOR
John H. Koenig, Bound Brook, and Ernest L. Kastenbein, Rutherford, N.J., assignors to Consolidated Electrodynamics Corporation, Pasadena, Calif., a corporation of California
Filed May 15, 1961, Ser. No. 109,820
6 Claims. (Cl. 117—215)

This invention relates to insulated electrical conductors, and particularly to a flexible ceramic-coated electrical conductor having operating capabilities at elevated temperatures.

It is often required that electrical conductors be used in ambient atmospheres at temperature levels well in excess of those at which conventional electrical insulating materials are operable. For a number of reasons, a need for effectively insulating electrical conductors often exists. Insulating coatings are required to prevent electrical leakage from turn to turn of the conductor or from the conductor to ground. Such coatings also serve to improve the inertness of conductors to chemical attack by agents such as oxygen or water at elevated temperatures so as to avoid changes in electrical conductivity by chemical conversion of the conductor to semiconducting or nonconducting chemical reaction products. Furthermore, insulating coatings are often required to improve mechanical properties such as abrasion resistance. In addition to imparting to electrical conductors characteristics of improved chemical resistance and improved mechanical properties, a low dielectric loss insulating coating for a conductor must be capable of withstanding the stresses resulting from winding, turning, and flexing of the coated conductor in the ordinary processes of preparation and handling of the conductor. The latter requirement means that the coating must be sufficiently flexible so that it does not spall when the conductor to which it is bonded is wound upon a relatively small diameter.

In a copending application Serial No. 98,317, filed March 27, 1961, a composite ceramic composition for providing an electrically nonconductive, flexible coating was described. The composite ceramic composition described in the above-identified copending application was an admixture consisting of from 45% to 60% by weight of a glass phase and from 45% to 70% of a crystalline phase. The present invention utilizes separate coatings of a glass phase and a crystalline phase to provide an insulated electrical conductor. The present invention is an insulated electrical conductor comprising an electrical conductor, a continuous coating of a low dielectric loss glass phase bonded to the conductor, and at least one coating of a low dielectric loss crystalline phase wettable by the glass and bonded to the glass phase coating. Additional coatings of crystalline phase may be successively bonded to the crystalline phase coating.

The term "glass phase" refers to a vitreous material that is adherent to metal and has a relatively low softening temperature. The glass phase must also have dielectric properties suitable for an insulator, particularly a low dielectric constant and a low power factor. The low dielectric loss of glasses having a high lead content makes such glasses particularly suitable as the glass phase. Preferably, the glass phase coating of the present invention is either a lead borosilicate, a lead aluminosilicate, or a mixture of the two. Among the lead borosilicates which can be satisfactorily used are those in which the molecular ratio is 1.00 $PbO$:1.63 $B_2O_3$:3.01 $SiO_2$; among the lead aluminosilicates which can be satisfactorily used are those in which the molecular ratio is 1.00 $PbO$:0.03 $Al_2O_3$:1.94 $SiO_2$. In addition to the use of either lead borosilicate or lead aluminosilicate alone to constitute the glass phase coating, such a coating may also be constituted of a mixture of lead aluminosilicate and lead borosilicate, preferably in a weight ratio of 4 parts lead aluminosilicate to 1 part lead borosilicate. While lead borosilicate and lead aluminosilicate constitute basic ternary systems satisfactory for use as the glass phase, modifying additives such as, but not limited to, cobalt oxide, nickel oxide, manganese oxide, and the like, may also be included as part of the glass phase coating.

The term "crystalline phase" refers to materials that retain a crystalline structure at temperatures above the softening temperature of the glass phase. The crystalline phase must have surface characteristics so that it is wettable by the glass phase, and, since it constitutes a part of the insulating coating, it must also have a low dielectric loss. Among the materials that may be used to constitute the crystalline phase coating of the present invention are wollastonite, calcined kaolinite, 100% alumina calcine, and 90% alumina calcine. As the crystalline phase coating, these materials are finely ground and preferably have a particle size less than 45 microns. It is presently preferred that the crystalline phase of the insulated conductor of the present invention be either wollastonite ($CaO.SiO_2$) or a 90% alumina ($Al_2O_3$) calcine.

The glass phase coating and crystalline phase coating combine in the insulated electrical conductor of the present invention to provide a coating that strongly adheres to conductors and yet has the flexibility and abrasion resistance. The glass phase coating is a relatively thin, impervious coating directly bonded to the conductor. The crystalline phase coating, bonded to the glass phase coating, consists of a layer of crystalline nodules in which layer void spaces exist between nodules. A schematic representation of an insulated electrical conductor in accordance with the present invention is shown in the attached drawing. Flexibility in the crystalline coating probably exists because, upon bending of the conductor, intermeshing of the crystalline phase kernels occurs whereby the void spaces of the inside of the turn are compressed while those on the outside of the turn are expanded.

The utilization of a separate glass phase coating as the coating adhering to the conductor and a separate crystalline phase coating furnishing an abrasion-resistant outer coating provides advantages. In addition to the flexibility inherent in the combined coatings, a wide selection of properties as to the separate coatings and the conductor, and of the variables attendant upon application of the coatings becomes possible. The possible combinations of conductor, glass phase coating, and crystalline phase coating are greatly expanded and can be varied to meet a variety of operating requirements.

The following specific example of an insulated electrical conductor according to the present invention, and the manner in which it is made, will serve to illustrate the nature of this invention.

The glass phase coating was lead borosilicate, having the molecular ratio 1.00 $PbO$:1.63 $B_2O_3$:3.01 $SiO_2$ and the following composition in weight percent:

| | |
|---|---|
| $PbO$ | 43.1 |
| $B_2O_3$ | 21.9 |
| $SiO_2$ | 35.0 |

This composition melted at about 1560° F. The lead borosilicate was added as a dry powder to a ball mill and was milled with water to form a ceramic slip. The slip was applied to a nickel-clad copper wire, 0.0159″ in diameter, by passing the wire through the slip. The slip-covered wire was passed through a coating die to leave a thin uniform layer of slip on the wire. The slip-covered wire was then fired at a temperature of about 1600° F. to provide a fused, relatively thin, continuous glass phase coating bonded to the wire.

A 90% alumina calcine was prepared as the crystalline phase. The 90% $Al_2O_3$ calcine had the following batch composition:

| | Percent |
|---|---|
| Alumina | 90 |
| Talc (Montana #1736) | 6.0 |
| Victoria clay | 4.0 |
| | 100.0 |

The alumina was prepared by thoroughly mixing the components of the calcine and then hydraulically extruding them into ⅛-inch rods. After drying, the rods were broken into small pieces and fired at a temperature of 2800° F. The pre-fired ceramic was then milled to produce a milled product of which 15% by weight was below one micron in size. The calcine had a dielectric constant (8600 mc.) of 8.6 and a power factor (8600 mc.) of 0.0024.

The alumina calcine was milled with water to form a slip and applied over the glass phase coating bonded to the conductor. The slip-covered wire was passed through a coating die to leave a thin uniform layer of slip on the wire and then fired at a temperature of 1700° F. Upon firing, the alumina calcine was bonded to the glass phase coating. An insulated electrical conductor was obtained which could be wound on a small diameter without spalling of the coating. Furthermore, the insulating coating on the conductor had high resistance values.

The insulated electrical conductor of the present invention requires a glass phase, as previously defined, bonded to the conductor and a crystalline phase, as previously defined, overlying the glass phase and bonded thereto. The flexibility and good resistance values which are obtained, combined with the temperature resistance, makes the insulated electrical conductor usable under severe environmental conditions. While the examples heretofore given have referred to the application of a single overlying coating of the crystalline phase, advantageous results can also be obtained by the application of additional crystalline phase coatings.

We claim:
1. An insulated flexible electrical conductor comprising an electrical conductor, a continuous thin coating of a low dielectric loss glass phase bonded to the conductor, and at least one coating of a low dielectric loss crystalline phase wettable by the glass phase and bonded to the glass phase coating, the crystalline phase retaining a crystalline structure above the softening point of the glass phase to produce a coating of crystalline nodules with void spaces between the nodules.

2. An insulated flexible electrical conductor comprising an electrical conductor, a continuous thin coating of a low dielectric loss glass phase bonded to the conductor, and at least one coating of a 90% alumina calcine bonded to the glass phase coating.

3. An insulated flexible electrical conductor comprising an electrical conductor, a continuous thin coating of a low dielectric loss glass phase bonded to the conductor, said glass phase being selected from the group consisting of lead borosilicate and lead aluminosilicate, and at least one coating of a low dielectric loss crystalline phase wettable by the glass phase and bonded to the glass phase coating, the crystalline phase retaining a crystalline structure above the softening point of the glass phase to produce a coating of crystalline nodules with void spaces between the nodules.

4. Conductor in accordance with claim 3 wherein the crystalline phase is wollastonite.

5. Conductor in accordance with claim 3 wherein the crystalline phase is 90% alumina calcine.

6. An insulated flexible electrical conductor comprising an electrical conductor, a continuous thin coating of a low dielectric loss glass phase bonded to the conductor, a first coating of a low dielectric loss crystalline phase wettable by the glass phase and bonded to the glass phase coating, and a second coating of a low dielectric loss crystalline phase bonded to the first crystalline coating, each of the crystalline phases retaining a crystalline structure above the softening point of the glass phase to produce a coating of crystalline nodules with void spaces between the nodules.

References Cited in the file of this patent
UNITED STATES PATENTS

| | | |
|---|---|---|
| 2,394,591 | Bricker | Feb. 12, 1946 |
| 2,677,070 | Milligan | Apr. 27, 1954 |
| 2,844,693 | Rigterink | July 22, 1958 |
| 2,877,144 | Iversen | Mar. 10, 1959 |
| 2,956,219 | Cianchi | Oct. 11, 1960 |